(12) United States Patent
Jin et al.

(10) Patent No.: US 9,732,900 B2
(45) Date of Patent: Aug. 15, 2017

(54) CENTERING DEVICE FOR DETERMINING POSITION OF A VEHICLE

(71) Applicant: Hyundai Motor Company, Seoul (KR)

(72) Inventors: Yo Hee Jin, Chungcheongnam-do (KR); Jin Sang Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 1 day.

(21) Appl. No.: 14/565,559

(22) Filed: Dec. 10, 2014

(65) Prior Publication Data

US 2016/0084429 A1 Mar. 24, 2016

(30) Foreign Application Priority Data

Sep. 22, 2014 (KR) ........................ 10-2014-0125774

(51) Int. Cl.
| | | |
|---|---|---|
| *B65G 1/04* | (2006.01) | |
| *B62D 65/00* | (2006.01) | |
| *B66F 7/06* | (2006.01) | |
| *F16M 11/18* | (2006.01) | |

(52) U.S. Cl.
CPC ............. *F16M 11/18* (2013.01); *B62D 65/00* (2013.01)

(58) Field of Classification Search
None
See application file for complete search history.

(56) References Cited

U.S. PATENT DOCUMENTS

| | | | | |
|---|---|---|---|---|
| 4,793,760 A | * | 12/1988 | Valli ....................... | E04H 6/307 414/254 |
| 5,851,098 A | * | 12/1998 | Buckenauer ............ | E04H 6/285 414/253 |
| 7,736,113 B2 | * | 6/2010 | Yook ....................... | E04H 6/183 414/256 |
| 2004/0071532 A1 | | 4/2004 | Valli | |
| 2010/0100228 A1 | | 4/2010 | Valli | |

FOREIGN PATENT DOCUMENTS

| | | |
|---|---|---|
| JP | H06-51419 U | 7/1994 |
| JP | H09-020273 A | 1/1997 |
| JP | H09-243521 A | 9/1997 |
| JP | H10-142109 A | 5/1998 |
| JP | 3169662 B2 | 5/2001 |
| JP | 2004-037401 A | 2/2004 |
| KR | 20-0212494 | 11/2000 |
| KR | 10-2001-0070568 A | 7/2001 |
| KR | 10-2003-0084993 A | 11/2003 |

* cited by examiner

*Primary Examiner* — Kavel Singh
(74) *Attorney, Agent, or Firm* — Mintz Levin Cohn Ferris Glovsky and Popeo, P.C.; Peter F. Corless

(57) ABSTRACT

A centering device for determining a position of a vehicle includes free roller parts configured to respectively seat left and right vehicle wheels of the vehicle. A driving body pushes the vehicle wheels when the vehicle is seated on the free roller parts. The centering device may be simply and rapidly installed on a floor with a minimal height. Thus, complicated construction is avoided. The centering device also has a plurality of sensors and a sensor cleaner on a first plate and a second plate. The first and second plates are driven at the same time, in opposite directions to center the vehicle.

16 Claims, 12 Drawing Sheets

CENTERING DEVICE FOR DETERMINING POSITION OF A VEHICLE

CROSS-REFERENCE TO RELATED APPLICATION

This application is based on and claims the benefit of priority to Korean Patent Application No. 10-2014-0125774, filed on Sep. 22, 2014 in the Korean Intellectual Property Office, the disclosure of which is incorporated herein in its entirety by reference.

TECHNICAL FIELD

The present disclosure relates to a centering device for determining a position of a vehicle, and more particularly, to a centering device for adjusting a position in a lateral direction of the vehicle so that the vehicle may be accurately positioned on a production line.

BACKGROUND

In general, a plurality of electric instruments are mounted in a vehicle. These electric instruments necessarily are inspected to checking whether or not the operation and quality thereof are normal in an inspection line portion of the production line. Typically, the inspection line portion is near the end of the production line after assembly of the vehicle is completed.

Most of electric instruments are mounted in the vehicle so that the mounted state or function thereof can only be determined if the vehicle is stopped at an accurate position. The production line of the vehicle is provided with a position determining device for determining the position of the vehicle so that the vehicle may be accurately aligned for such inspection.

However, the position determining device of the vehicle increases a vertical height due to a formation of a V-shaped alignment groove. Therefore, in order to install the position determining device in the production line, a hole or pit in the floor is required and the position determining device is arranged in the hole.

In other words, the position determining device according to the related art requires a pit construction requiring bed excavation, pouring concrete, curing, covering, and the like. As a result, construction costs are increased, production may be delayed, time is consumed, and so forth.

SUMMARY

The present disclosure has been made to solve the above-mentioned problems occurring in the prior art while still providing the advantages achieved by the prior art.

An aspect of the present disclosure provides a centering device for determining a position of a vehicle, and more particularly, a centering device for determining a position of a vehicle capable of adjusting a position in a lateral direction of the vehicle so that the vehicle may be accurately positioned on a production line.

According to an exemplary embodiment of the present disclosure, a centering device for determining a position of a vehicle includes: free roller parts configured to respectively seat left and right vehicle wheels of the vehicle; and a driving body configured to push and transport the vehicle wheels of the vehicle seated on the free roller parts.

A pair of free roller parts may be installed spaced apart from each other to transport the vehicle by external force applied to the seated vehicle. The driving body may be formed between the pair of free roller parts.

The driving body may include: a first plate reciprocatingly driving the vehicle from a center by power of a transport cylinder; a second plate connected to the first plate through a link member and reciprocatly driven in an opposite direction by linking with the first plate; and pressing levers respectively formed at the first plate and the second plate so that the first plate and the second plate extend towards the free roller parts to push and transport the vehicle wheels.

The free roller parts may be horizontally formed over a bottom surface of a production line for the vehicle.

The transport cylinder may be arranged in parallel with the first plate and couple a transport rod operated by fluid pressure to the first plate by a bracket.

The free roller parts may include a plurality of rollers which are freely rotated about a rotation shaft parallel to an axis extending between the front and rear of the vehicle. The rollers may be arranged on the same line of the rotation shaft and be alternately arranged in a zigzag pattern in a horizontal direction at the same time.

The link member may include: a pair of first and second links having one end portion which is rotatably coupled to each of the first plate and the second plate, respectively, and the other end portion of an opposite side which is not coupled to the first plate and the second plate and leads to any one side of the first plate and the second plate; and a third link having both ends coupled to the other end portions of the first and second links by a two-coupling and a center between the both ends rotatably coupled to the driving body between the first plate and the second plate.

The first plate and the second plate may be respectively provided with complimentary shaped abutting edges. The edges may have bonded first and second shape surfaces so that faces toward the center of the driving body are fit together with each other by concave and convex shapes.

Preferably, the first plate and the second plate form a penetrating hole for rotatably connecting the center of the third link to the driving body may be respectively formed.

The centering device may further include: a transport elastic body coupled to a driving rod of the transport cylinder and transported integrally with the driving rod; and fixed elastic bodies to mitigate shock by being in contact with the transport elastic body upon an occurrence of excessive stroke of the driving rod.

The driving body may include a seating sensing sensor providing data necessary to control the drive of the first plate and the second plate by sensing whether or not the vehicle is seated on the driving body.

The driving body may include a sensor cleaner which is contact with the seating sensing sensor to remove foreign materials formed on a surface of the seating sensing sensor. The sensor cleaner is mounted to at least one of the first plate and the second plate.

One side of at least one of the first plate and the second plate may be provided with a sensing protrusion, and the driving body may include position sensing sensor sensing a position of the sensing protrusion to provide data necessary to control the drive of the first plate and the second plate.

The free roller parts may include a plurality of rollers which are freely rotated about a rotation shaft, and the rollers may be slantingly arranged at both ends based on a center.

The free roller part may include: a first frame integrating the plurality of rollers arranged at one end based on the center; a second frame integrating the plurality of roller arranged at the other end based on the center; and a guide fixing the first frame and the second frame.

The first frame, the second frame, and the guide may be provided with a plurality of insertion holes, which are coupled to each other through an insertion member for selectively allowing adjustment intervals of the first frame and the second frame.

According to another exemplary embodiment of the present disclosure, a centering device for determining a position of a vehicle includes: a pair of free roller parts spaced apart from each other to respectively seat left and right vehicle wheels and move the wheels in a lateral direction by external force applied to the seated vehicle; and a driving body formed between the pair of free roller parts to push and, in turn, move the vehicle wheels of the vehicle seated on the free roller parts, wherein the driving body includes a first plate reciprocatingly driving the vehicle by power of a transport cylinder; a second plate connected to the first plate through a link member and reciprocatingly driven in an opposite direction by linking with the first plate; and pressing levers respectively formed at the first plate and the second plate to push and, in turn, move the vehicle wheels.

It should be appreciated that the subject technology can be implemented and utilized in numerous ways, including without limitation as a process, an apparatus, a system, a device, a method for applications now known and later developed. These and other unique features of the system disclosed herein will become more readily apparent from the following description and the accompanying drawings.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiments are described as using a plurality of units to perform the exemplary process, it is understood that the exemplary processes may also be performed by one or a plurality of modules or units that are combined and arranged into fewer or more parts that provide the same functional advantages. Relational terms such as left, right, up and down are with reference to the figures for purposes of explanation and not meant in a limiting sense.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Exemplary embodiments of the present disclosure will be described in detail with reference to the accompanying drawings.

Figure 1:
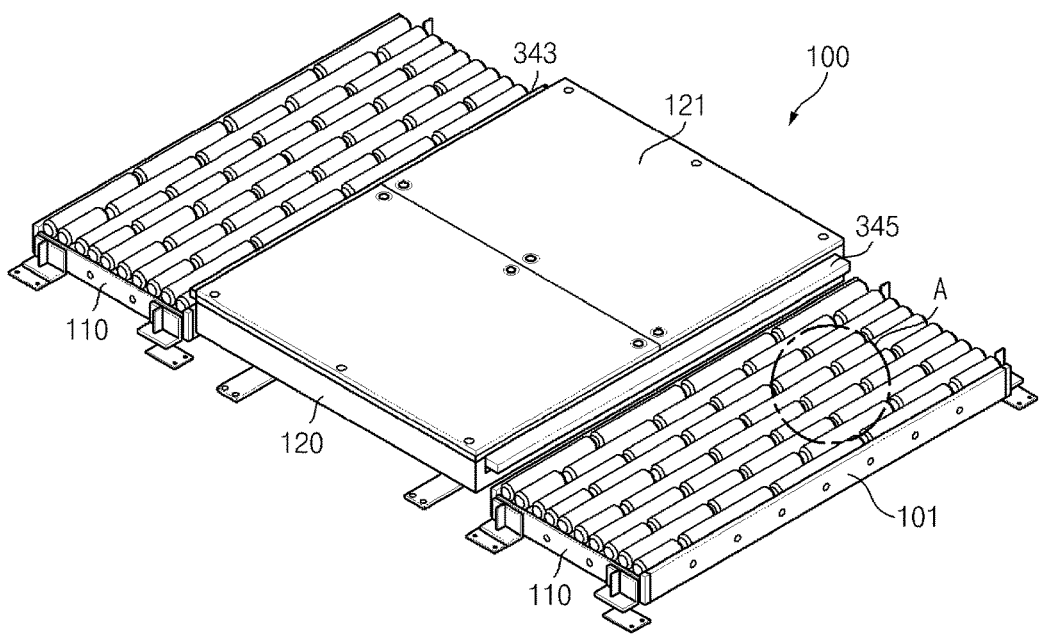
FIG. 1 is a perspective view showing an exterior of a centering device according to an exemplary embodiment of the present disclosure.

Referring to FIG. 1, the centering device 100 according to an exemplary embodiment of the present disclosure is shown schematically in a perspective view.

A centering device 100 for determining a position of a vehicle (not shown) according to the present disclosure includes free roller parts 110 configured to respectively seat left and right wheels of the vehicle, and a driving body 120 configured to push and transport the vehicle wheels of the vehicle seated on the free roller parts 110.

Referring to FIG. 1, the centering device 100 includes a pair of free roller parts 110 which are installed to be spaced apart from each other so that left and right vehicle wheels are respectively seated. The driving body 120 is formed between the pair of free roller parts 110.

The free roller part 110 has a plurality of rollers 210 (see FIG. 2) which freely rotate. The rollers 210 are formed on a frame structure 101 of a plane shape having a predetermined height from a floor (not shown), thereby transporting the vehicle seated thereon in a lateral direction.

The driving body 120 has a predetermined height from the floor, which is higher than the height of the free roller part 110, and is formed in a frame structure of a plane shape forming an interior space.

Pressing levers 343 and 345 are formed in the interior space of the driving body 120 so as to push the vehicle wheels of the vehicle seated on the free roller parts 110 and transport the vehicle. The pressing levers 343 and 345 are horizontally driven toward upper portions of the free roller parts 110. An upper portion of the driving body 120 is formed to be covered by a cover 121 so that an operation part formed therein is blocked from the outside.

Figure 2:
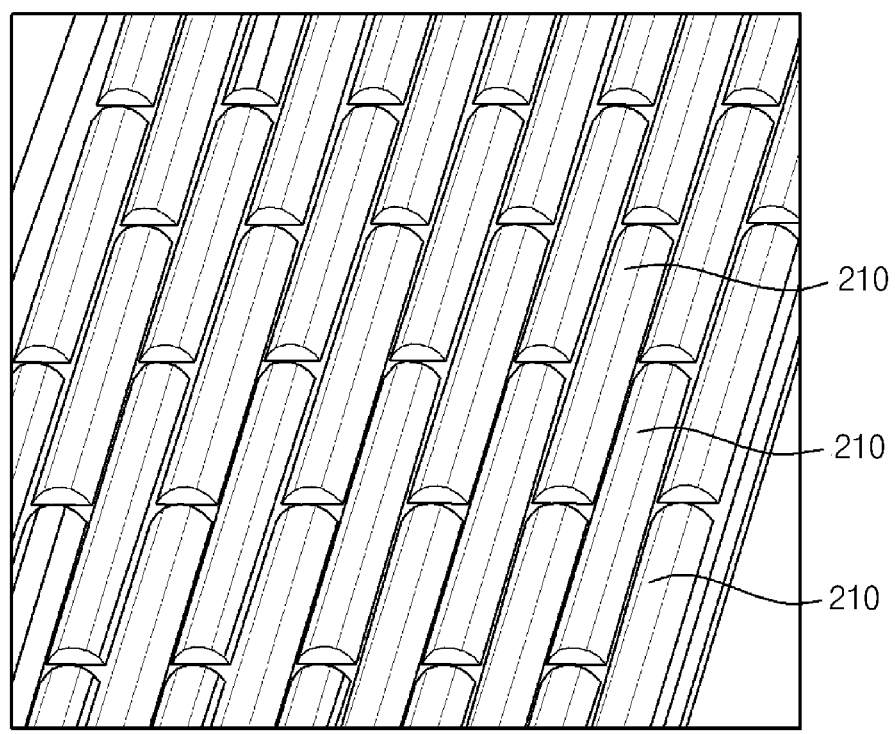
FIG. 2 is an expanded view inside circle A of FIG. 1 showing a free roller part of the centering device.

FIG. 2 is an enlarged view of the plurality of rollers 210 inside circle A of FIG. 1. As shown in FIG. 2, the plurality of rollers 210 freely rotate about a rotation shaft (not shown) that runs parallel to an axis extending from the front to the rear of the vehicle (e.g., along the production line). The plurality of rollers 210 may be arranged on the same line as the shaft and may be alternately arranged in a zigzag in a horizontal direction at the same time.

Figure 9:
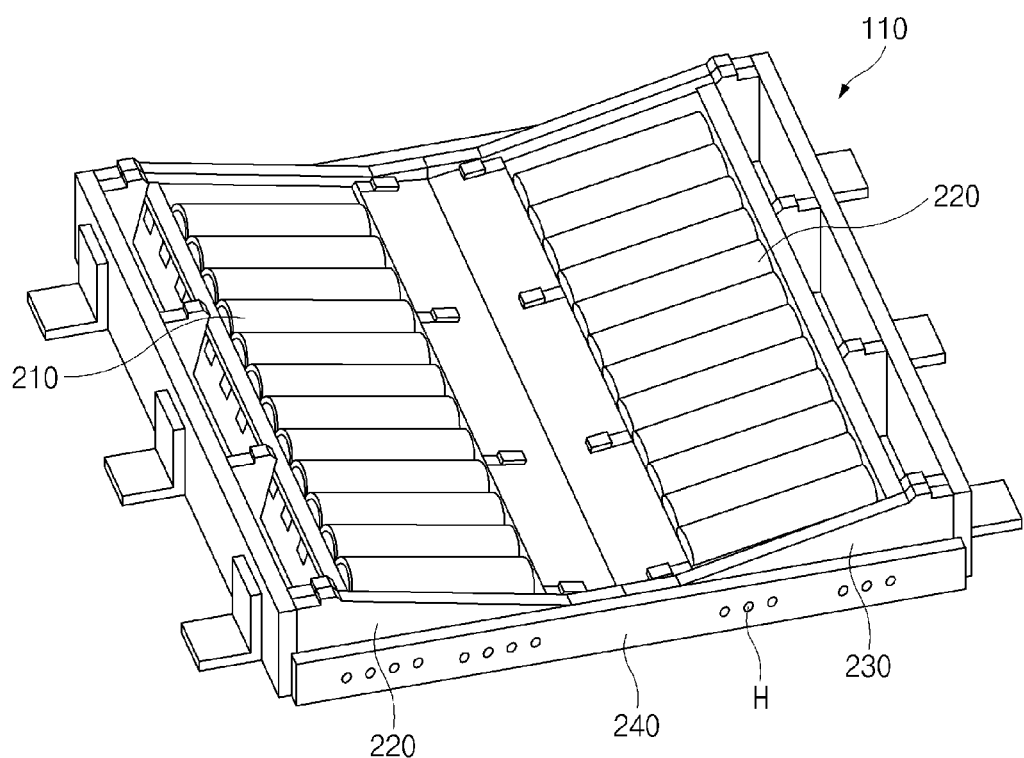
FIGS. 9 and 10 are perspective views showing another exemplary embodiment of the free roller part of the centering device shown in FIG. 1.
Figure 10:
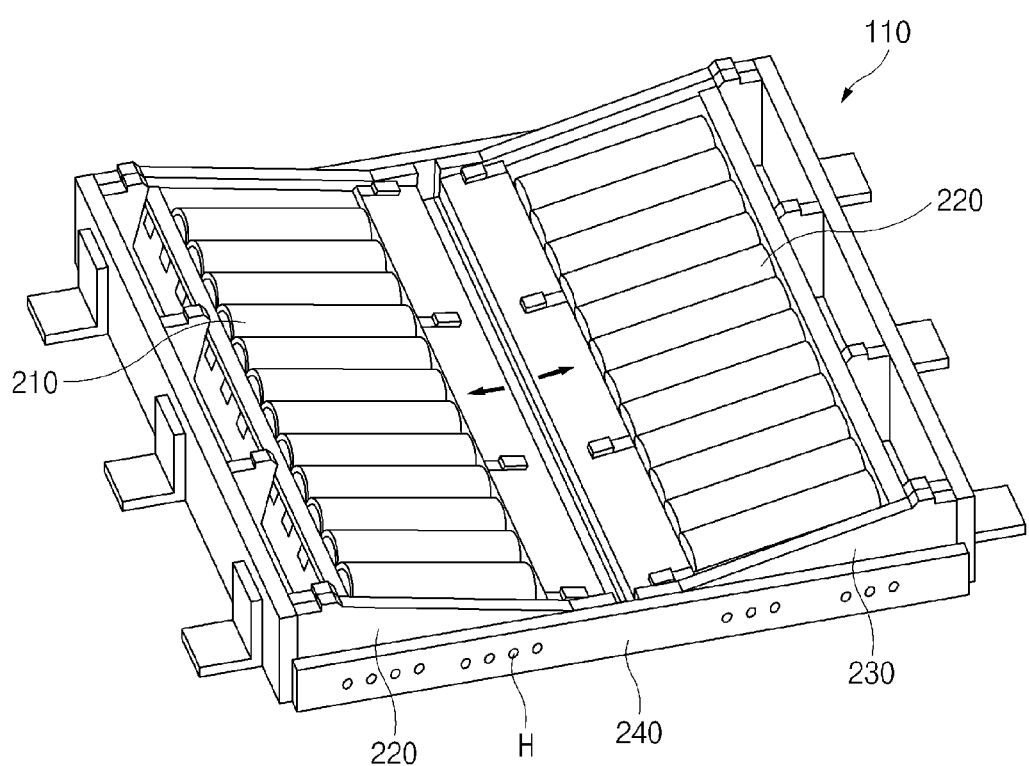
Figure 11:
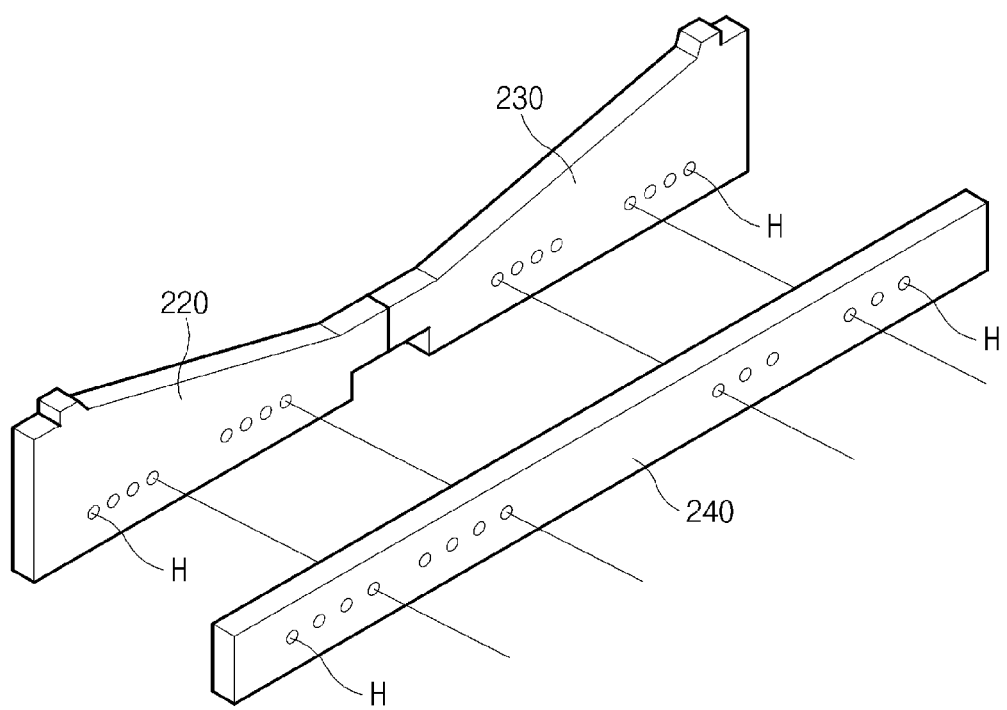
FIGS. 11 and 12 are perspective views showing a coupling relationship of a first frame, a second frame, and a guide according to another exemplary embodiment of the free roller part of the centering device shown in FIGS. 9 and 10.
Figure 12:
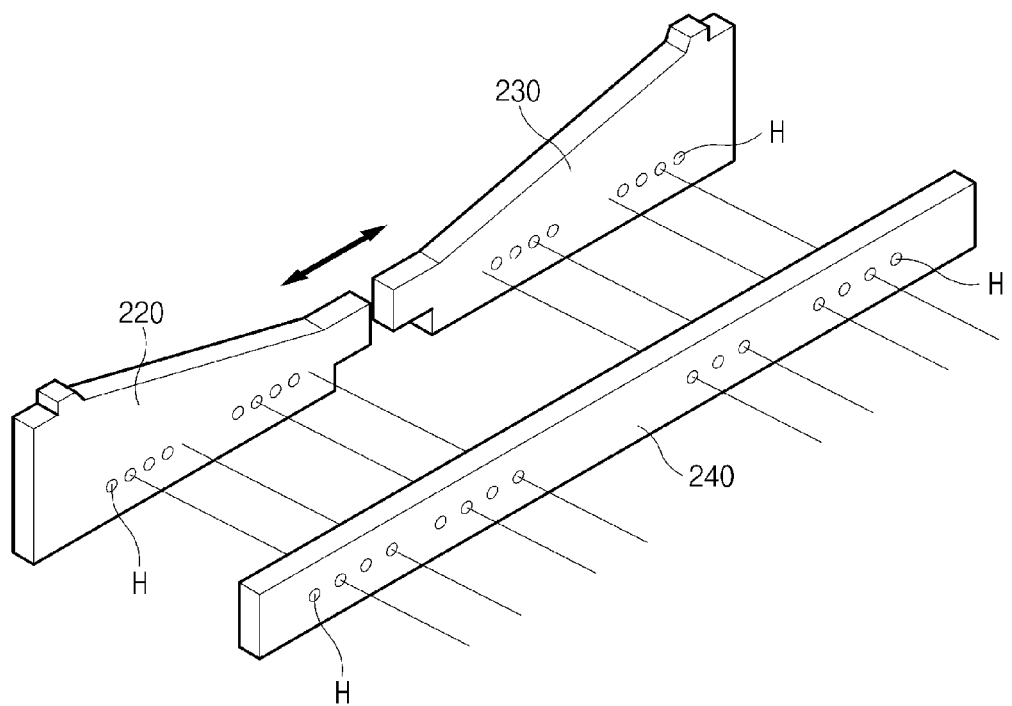

Referring now to FIGS. 9 and 10, views showing another exemplary embodiment of the free roller part of the centering device are shown. Referring additionally to FIGS. 11 and 12, views are illustrated to show a coupling relationship of a first frame, a second frame, and a guide according to another exemplary embodiment of the free roller part of the centering device shown in FIGS. 9 and 10.

As shown in FIGS. 9 and 10, the free roller part 110 includes the plurality of rollers 210 which are freely rotated about the rotation shaft, wherein the plurality of rollers 210 are slantingly arranged at both ends to slope down from the periphery towards a low center point. The free roller part 110 includes a first frame 220 supporting the plurality of rollers 210 arranged at one end, a second frame 230 supporting the plurality of roller 210 arranged at the other end of the first frame 220, and a guide 240 fixing the first frame 220 and the second frame 230.

The first frame 220, the second frame 230, and the guide 240 are respectively provided with a plurality of insertion holes H, which are coupled to each other through an insertion member (not shown). The insertion holes H allow intervals of the first frame 220 and the second frame 230 from the guide 240 to be adjusted and fixed. Thus, in the case of small vehicle, as shown in FIGS. 9 and 11, the guide 240 is coupled to the first and second frames 220 and 230 in a state in which the interval between the first frame 220 and the second frame 230 is minimized. Alternatively, in the case of large vehicle, as shown in FIGS. 10 and 12, the guide 240 is coupled to the first and second frames 220 and 230 in a state in which the interval between the first frame 220 and the second frame 230 is increased. As a result, it is possible to adjust the interval of the free roller part 110 according to the vehicle wheel.

Figure 3:
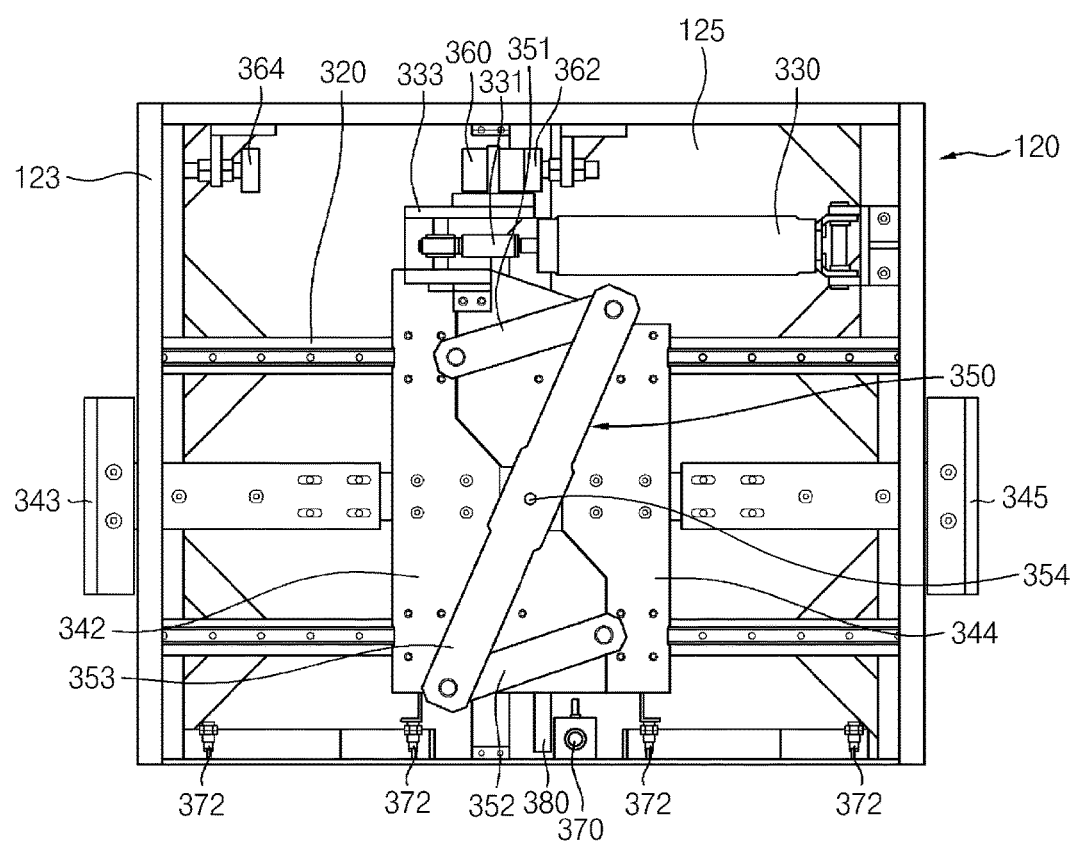
FIG. 3 is a plane view showing a driving body of the centering device shown in FIG. 1.

Referring now to FIG. 3, the driving body 120 of the centering device 100 of FIG. 1 is illustrated. The driving body 120 includes a first plate 342 which is reciprocatingly driven from the center to the lateral direction of the vehicle by power of a transport cylinder 330. A second plate 344 of the driving body 120 is connected to the first plate 342 through a link member 350 so that the second plate 342 is reciprocatingly driven in an opposite direction to that of the first plate 342. Pressing levers 343 and 345 respectively formed on outer sides of the first plate 342 and the second plate 344 towards the free roller parts 110 can push and, thereby, transport the vehicle wheels seated on the free roller parts 110 for alignment.

Specifically, the driving body 120 is formed in a frame 123 of a rectangular shape forming an interior space 125. The driving body 120 has a guide rail 320 guiding the first plate 342 and the second plate 344 for reciprocatingly sliding in the interior space 125.

The first plate 342 and the second plate 344 are driven in directions opposite to each other by driving force of the transport cylinder 330. In a retracted state, the inner sides of the plates 342 and 344 are in contact with each other substantially at a center of the driving body 120.

The transport cylinder 330 is mounted in one side of the interior space 125 of the driving body 120. The transport cylinder 330 includes a transport rod 331 generating linear transporting force by hydraulic pressure or pneumatic pressure. The transport rod 331 couples to the first plate 342 and is reciprocatingly driven left and right to accomplish motion of the plates 342 and 344 as described below.

The second plate 344 is connected to the first plate 342 by the link member 350. Again, the first plate 342 is driven by the transport rod 331 of the transport cylinder 330. The link member 350 has a two-point connection structure so that when the first plate 342 which is driven by the transport cylinder 330, the second plate 344 is reciprocatingly driven in the opposite direction. In other words with reference to FIG. 3, if the first plate 342 moves left, the second plate 344 moves right and vice versa.

The pressing levers 343 and 345 are formed at the outer sides of the respective plates 342 and 344, respectively. In one embodiment, the pressing levers 343 and 345 are integrally formed with the plates 342 and 344. The pressing levers 343 and 345 are free to move in the left and right lateral directions with the plates 342 and 344. The pressing members 343 and 345 are horizontally transported above the upper portions of the free roller parts 110, thereby able to push and transport the vehicle wheels seated on the free roller parts 110 in the lateral direction.

Still referring to FIG. 3, the link member 350 includes a first link 351 rotatably connected to the first plate 342 and second link 352 rotatably coupled to the second plate 344. A third or central link 353 extends between the first and second links 351 and 353. The opposing ends of the third link 353 are respectively rotatably coupled to the first link 351 and the second link 352 by a two-coupling. A center point 354 of the third link 353 is rotatably coupled to the driving body 120 through a space formed between the first plate 342 and the second plate 344.

For the centering device 100, the driving body 120 also includes buffering members 360, 362, and 364 for preventing shock that can occur to the transport rod 331 of the transport cylinder 330 and the first and second plates 343 and 345 from collision with any one side of the driving body 120.

In addition, at least one side of the upper driving body 120 is further provided with a seating sensing sensor 370 to determine whether or not the vehicle is seated on the driving body 120. The upper driving body 120 may also include position sensing sensors 372 to determine driving positions of the first plate 342 and the second plate 344, and a sensor cleaner 380 capable of removing foreign materials from the seating sensing sensor 370 and the like.

Figure 4:
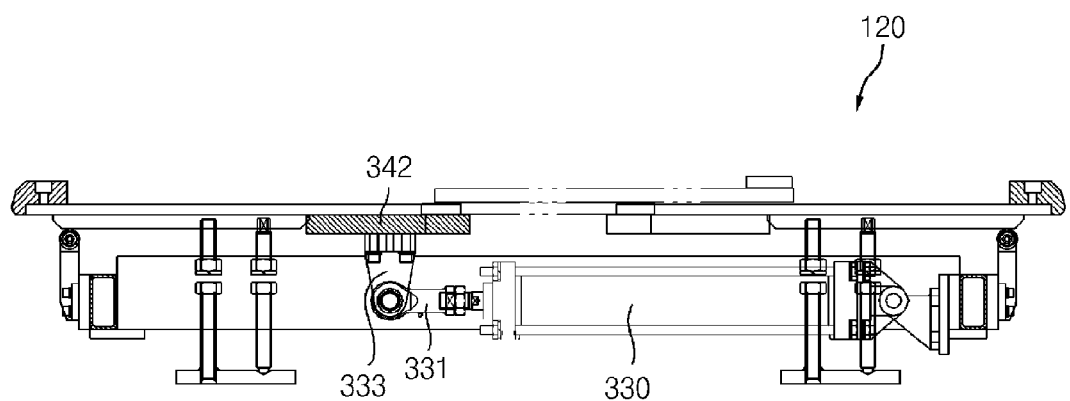
FIG. 4 is a side view showing a coupling structure of a transport cylinder and a first plate of the centering device shown in FIG. 3.

Referring now to FIG. 4, a side view of a coupling structure of the transport cylinder 330 and the first plate 342 of the centering device 100 is shown. The transport cylinder 330 may be formed so that the transport rod 331 is horizontally arranged on one side of the first plate 342. The transport rod 331 is linearly driven and coupled to the first plate 342 through a coupling member 333 such as a bracket, or the like. In this case, the transport cylinder 330 is arranged on a horizontal line of the first plate 342 or is arranged in parallel to the coupling member 333 while having a predetermined height difference by considering a height of the coupling member 333 itself, thereby making it possible to minimize the height of the driving body 120.

Figure 5:
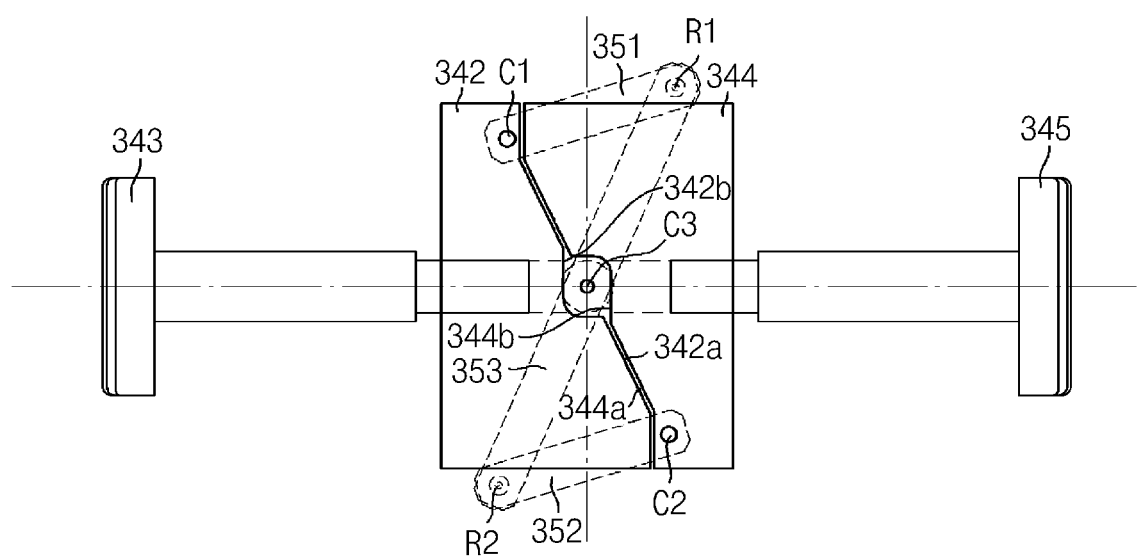
FIG. 5 is an exploded view showing an interior structure of the driving body shown in FIG. 3.

Referring to FIG. 5, an exploded view showing an interior structure of the driving body 120 is shown in more detail. Preferably, the first plate 342 and the second plate 344 are both provided with a plurality of bonded first shape surface portions 342a and second shape surface portions 344a so that faces of the sides facing each other (e.g., the faces toward the center of the driving body 120) fit together with each other such as by having concave and convex shapes respectively. The plates 342 and 344 also have a first groove part 342b and a second groove part 344b, respectively, to form a penetrating hole for allowing connecting the center point 354 of the third link 353 to the driving body 120.

Turning to the link 350 again, one end portion of the first link 351 is coupled to the outer side of the first plate 342 by a rotation shaft C1. One end portion of the second link 352 is coupled to the outer side of the second plate 344 in an opposite manner by a rotation shaft C2. The links 351 and 352 are a predetermined length.

The third link 353 is formed to be longer than the first and second links 351 and 352 to thereby respectively couple the other end portions of the first and second links 351 and 352. The third link 353 is joined to the links 351 and 352 by the two couplings R1 and R2, respectively. The center point 354 of the third link 353 is coupled to the driving body 120 by a rotation shaft C3 passing through the penetrating holes formed at the centers of the first plate 342 and the second plate 344.

Figure 6:
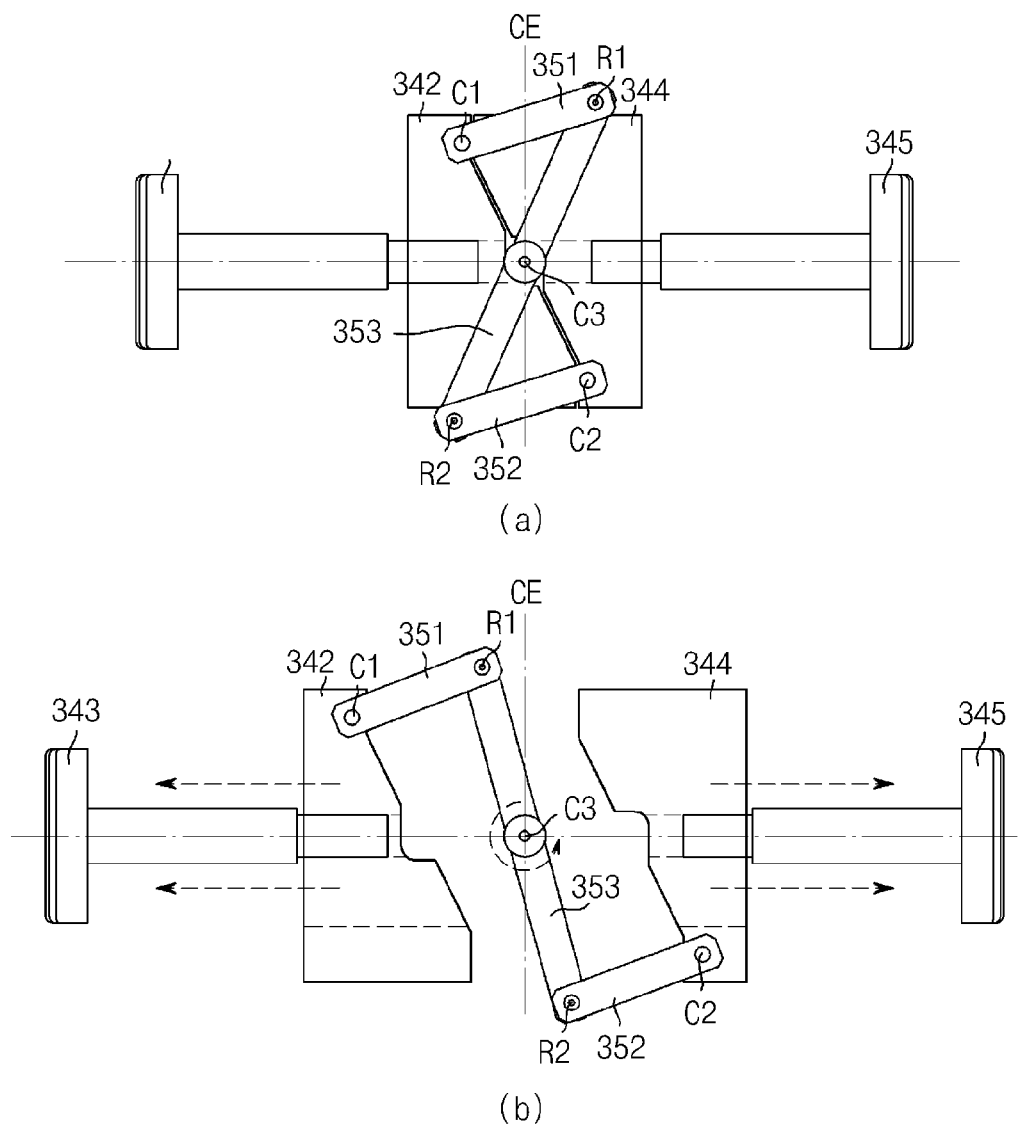
FIG. 6 is a state view showing operations of first and second plates shown in FIG. 5.

Referring now to FIG. 6, diagram (a) shows a minimized operational state of the first and second plates 342 and 344 and diagram (b) shows an expanded operational state of the first and second plates 342 and 344. As the plates 342 and 344 move from the minimized operational state to the expanded operational state, the first plate 342 is transported from the center of the driving body 120 in the lateral direction by the transport cylinder 330. The first link 351, which is coupled by the rotation shaft C1 is simultaneously transported, thereby rotating the third link 353 connected to the first link 351 by the coupling R1 in a counterclockwise direction based on the rotation shaft C3 positioned at the center of the driving body 120 to thereby transport the third link 353 in the transporting direction of the first plate 342. The third link 353 is transported toward the second plate 344 which is also the counterclockwise direction by the rotation shaft C3 positioned at the center of the driving body 120. As a result of the second link 352 being connected to the third link 353 by the coupling R2, this movement of third link 353 moves the second link 352, which moves the second plate 344 in an opposite direction of the first plate 342.

On the contrary, in the case in which the first plate 342 is moved to the center of the driving body 120 by the transport cylinder 330, the first link 351, the second link 352, and the third link 353 are conversely operated, thereby transporting the first plate 342 and the second plate 344 so as to be in contact with each other the center of the driving body 120 as shown in diagram (a).

As a result of the motion described above, the pressing levers 343 and 345 are respectively transported in the lateral direction and, in turn, are horizontally transported across the upper portions of the free roller parts 110. Thus, the pressing levers 343 and 345 can push the vehicle wheels of the vehicle seated on the free roller parts 110 and transport the vehicle. As a result of the pressing pushing the vehicle in the lateral direction, it is possible to align the vehicle and the center of the lateral direction of the driving body 120 to be positioned at the same position as each other. In effect, pushing the vehicle centers the vehicle above the driving body 120.

Meanwhile, the operations of the pressing levers 343 and 345 may manually and automatically control a speed, a transporting distance, and the like so that the speed, the transporting distance, and the like may be differently set depending on a distance between the vehicle wheels of various models of vehicles.

Figure 7:
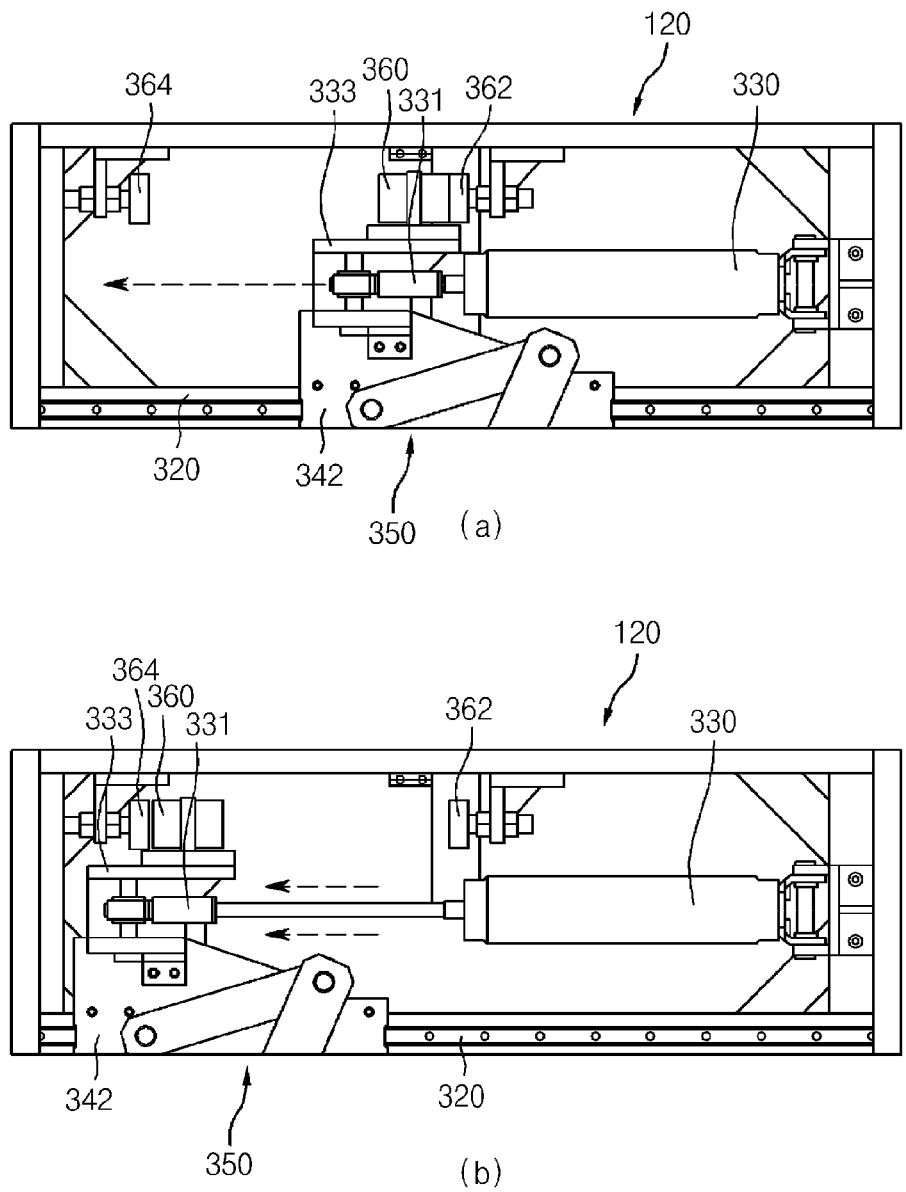
FIG. 7 is an expanded view showing a buffering member of the centering device shown in FIG. 3.

Referring now to FIG. 7, an enlarged view of the buffering member of the centering device 100 is shown. The buffering member includes a transport elastic body 360 which is formed at one side of the transport rod 331. The buffering member has fixed elastic bodies 362 and 364 formed on the driving body 120 and preventing both sides of the transport elastic body 360 from directly colliding with the driving body 120.

The fixed elastic bodies 362 and 364 may be formed to be respectively positioned at both sides of a maximum reciprocating section of the transport elastic body 360 which is transported integrally with the transport rod 331. Thus, the fixed elastic bodies 362 and 364 serve as a stopper preventing a movement of the first plate 342 or serve to buffer the shock occurred when the transport rod 331 and the first plate 342 comes in contact with the driving body 120. Therefore, when the transport rod 331 is moved to the maximum stroke point in the extended lateral direction, damage and failure which may occur by the collision with the driving body 120 may be prevented. In this case, as the first plate 342 and the transport rod 331 are stopped by the buffering member. Thus, the operation of the link member 350 is stopped, and as a result, the second plate 344 may also be prevented from a shock occurrence upon the maximum stroke.

Figure 8:
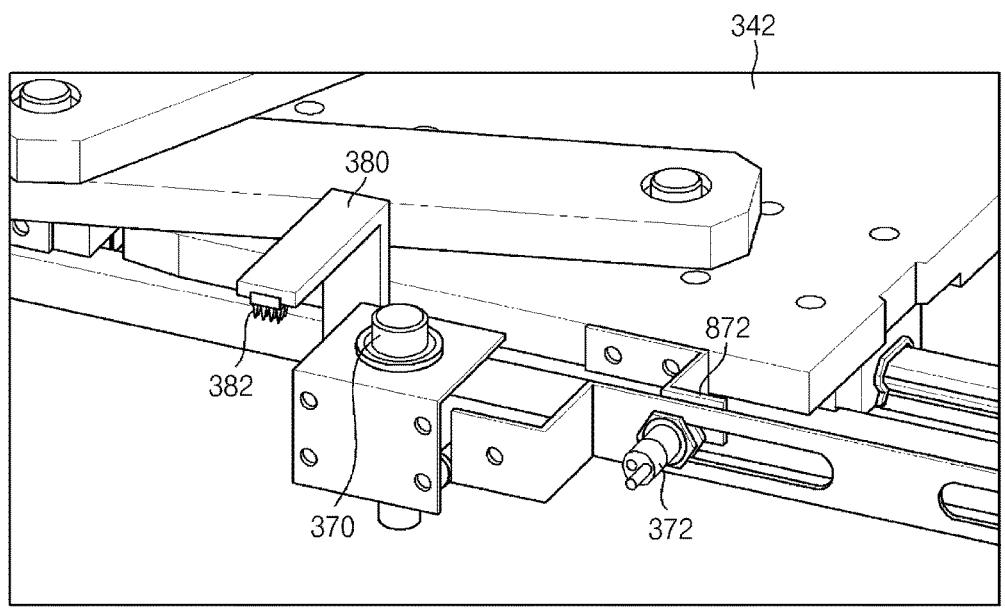
FIG. 8 is an expanded view showing a characteristic part of the centering device shown in FIG. 3.

Referring to FIG. 8, a detailed view of one main part of the centering device 100 is shown. Specifically, FIG. 8 shows the structure of the seating sensing sensor 370, the position sensing sensor 372, and the sensor cleaner 380 which are mounted in the driving body 120. The seating sensing sensor 370 and the position sensing sensor 372 may be mounted at one side of the driving body 120 which is adjacent to any one of the first plate 342 and the second plate 344.

The seating sensing sensor 370 may control the drive of the driving body 120 depending on whether or not the vehicle is seated by sensing whether or not the vehicle is stopped and seated on the driving body 120.

The position sensing sensor 372 may be installed adjacent to at least one side portion of the first plate 342 and the second plate 344. The position sensing sensor 372 interacts with a sensing protrusion 872 to determine whether or not the first plate 342 or the second plate 344 is close within a certain distance. The reading may be ON or OFF. By having the sensing protrusion 872 connected to the first plate 342 and/or the second plate 344 and sensing a position of the sensing protrusion 872, positional information about the first plate 342 and/or the second plate 344 is known. The position sensing sensor 372 may be formed at a plurality of points, each of which may be paired with a sensing protrusion 872.

In addition, the sensor cleaner 380 is mounted at any appropriate spot with respect to the first plate 342 and the second plate 344. The sensor cleaner 380 preferably moves together with the first plate 342 and/or the second plate 344 so as to pass over the seating sensing sensor 370. The sensor cleaner 380 has a foreign material removing brush 382 formed at a lower portion thereof which is closely adhered to an upper surface of the seating sensing sensor 370 to remove foreign materials. Therefore, the seating sensing sensor 370 is cleanly maintained so that the transport cylinder 330 can be controlled depending on whether on not the vehicle is seated. As a result, driving the first plate 342 and the second plate 344 is beneficially controlled by the sensing of the seating sensing sensor 370.

In operation, the first plate 342 and the second plate 344 are driven by the transport cylinder 330 in order to determine and center the position in the lateral direction of the vehicle. At the same time, the sensing protrusion 872 and the sensor cleaner 380 are simultaneously moved such that the position of the first plate 342 and the second plate 344 may be sensed and the foreign material on the seating sensing sensor 370 may be continuously removed.

The centering device 100 according to the present disclosure as described above is formed by the driving body 120 and the free roller parts 110 having a horizontal structure with the floor. The structure operating the pressing levers 343 and 345 is formed by the transport cylinder 330 having the horizontal arrangement, thereby making it possible to minimize the height of the centering device 100 from the floor. Therefore, the vehicle may be easily seated by simply installing a production line of the vehicle, or the like on the floor without constructing a hole for laying the existing centering device 100 using a servo motor, or the like in the floor, thereby making it possible to reduce time and cost required for digging of the hole, the laying of the device and the like.

In addition, since the centering device 100 has a very suitable structure for installing and working with the plurality of sensors and the sensor cleaner 380, it is possible to improve efficiency of driving control and durability.

As described above, according to the exemplary embodiments of the present disclosure, the centering device for determining the position of the vehicle may be simply and rapidly installed on the floor by having a plate shape horizontal with the floor and minimizing a height thereof, whereby a process of digging a hole in the floor and laying the centering device therein is omitted, thereby making it possible to significantly reduce time and cost spent for the construction as well as other advantages.

In addition, since the centering device for determining the position of the vehicle according to the present disclosure has a very suitable structure for installing and working with the plurality of sensors and the sensor cleaner as well as the first and second plates and the driving body which are driven in parallel with each other, it is possible to improve efficiency of a driving control and durability.

As described above, although the present disclosure has been described with reference to exemplary embodiments and the accompanying drawings, it would be appreciated by those skilled in the art that the present disclosure is not limited thereto but various modifications and alterations might be made without departing from the scope defined in the following claims.

What is claimed is:

1. A centering device for determining a position of a vehicle, the centering device comprising:
   free roller parts configured to respectively seat left and right vehicle wheels of the vehicle; and
   a driving body configured to move the vehicle wheels of the vehicle seated on the free roller parts,
   wherein the driving body includes:
   a first plate reciprocatingly driven in a lateral direction of the vehicle by a transport cylinder;
   a second plate connected to the first plate through a link member and reciprocatingly driven in an opposite direction by linking with the first plate; and
   a plurality of pressing levers, wherein at least one of the pressing levers is formed at the first plate to push and thereby move one of the vehicle wheels, and a remainder of the pressing levers are formed at the second plate to push and thereby move another of the vehicle wheels,
   wherein the link member includes:
   a pair of first and second links rotatably coupled to the first plate and the second plate, respectively; and
   a third link extending between the first and second links, wherein a center of the third link is rotatably coupled to the driving body between the first plate and the second plate.

2. The centering device according to claim 1, wherein a pair of free roller parts are spaced apart from each other and transport the vehicle by external force applied to the seated vehicle.

3. The centering device according to claim 2, wherein the driving body is formed between the pair of free roller parts.

4. The centering device according to claim 1, wherein the free roller parts are horizontally formed over a bottom surface of a production line of the vehicle.

5. The centering device according to claim 1, wherein the transport cylinder is arranged in parallel with the first plate and couples a transport rod operated by fluid pressure to the first plate by a bracket.

6. The centering device according to claim 1, wherein the free roller parts include a plurality of rollers which are freely rotated using front and rear directions of the vehicle as a rotation shaft, and the rollers are arranged on the same line of the rotation shaft and are alternately arranged in a zigzag in a horizontal direction at the same time.

7. The centering device according to claim 1, wherein the first plate and the second plate are respectively provided with complimentary concave and convex shapes to fit together.

8. The centering device according to claim 7, wherein when the first plate and the second plate fit together, the first plate and the second plate form a penetrating hole for rotatably connecting the center of the third link to the driving body.

9. The centering device according to claim 1, further comprising:
   a transport elastic body coupled to a driving rod of the transport cylinder and transported integrally with the driving rod; and
   fixed elastic bodies mounted in the driving body for mitigating shock by being in contact with the transport elastic body upon an occurrence of excessive stroke of the driving rod.

10. The centering device according to claim 1, wherein the driving body includes a seating sensing sensor providing data necessary to control drive of the first plate and the second plate by sensing whether or not the vehicle is seated on the driving body.

11. The centering device according to claim 10, wherein the driving body includes a sensor cleaner which is contact with the seating sensing sensor to remove foreign materials formed on a surface of the seating sensing sensor, the sensor cleaner being integrally coupled to at least one of the first plate and the second plate.

12. The centering device according to claim 1, wherein one side of at least one of the first plate and the second plate is provided with a sensing protrusion, and
   the driving body includes a position sensing sensor determining a position of the sensing protrusion and providing data necessary to control the drive of the first plate and the second plate based on the determining.

13. The centering device according to claim 1, wherein the free roller parts include a plurality of rollers which are freely rotated along a rotation shaft, and the rollers are slantingly arranged to be higher at peripheral edges.

14. The centering device according to claim 13, wherein the free roller part includes:
   a first frame integrating the plurality of rollers arranged at one end based on the center;
   a second frame integrating the plurality of roller arranged at the other end based on the center; and
   a guide fixing the first frame and the second frame.

15. The centering device according to claim 14, wherein the first frame, the second frame, and the guide are provided with a plurality of insertion holes, which are coupled to each other through an insertion member and allow intervals of the first frame and the second frame from the guide to be selectively adjusted according to a size of the vehicle.

16. A centering device for determining a position of a vehicle, the centering device comprising:
free roller parts configured to respectively seat left and right vehicle wheels of the vehicle; and
a driving body configured to move the vehicle wheels of the vehicle seated on the free roller parts,
wherein the driving body includes:
a first plate reciprocatingly driven in a lateral direction of the vehicle by a transport cylinder;
a second plate connected to the first plate through a link member and reciprocatingly driven in an opposite direction by linking with the first plate; and
a plurality of pressing levers, wherein at least one of the pressing levers is formed at the first plate to push and thereby move one of the vehicle wheels, and a remainder of the pressing levers are formed at the second plate to push and thereby move another of the vehicle wheels,
wherein the first plate and the second plate are respectively provided with complimentary concave and convex shapes to fit together.

\* \* \* \* \*